United States Patent
Son

(10) Patent No.: US 12,026,428 B2
(45) Date of Patent: Jul. 2, 2024

(54) AUDIO VIDEO NAVIGATION SYSTEM FOR VEHICLE AND METHOD FOR PLAYING MEDIA THEREOF

(71) Applicants: Hyundai Motor Company, Seoul (KR); Kia Motors Corporation, Seoul (KR)

(72) Inventor: Hyouk Jea Son, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 73 days.

(21) Appl. No.: 17/082,919

(22) Filed: Oct. 28, 2020

(65) Prior Publication Data

US 2021/0173616 A1    Jun. 10, 2021

(30) Foreign Application Priority Data

Dec. 10, 2019    (KR) .......................... 10-2019-0163354

(51) Int. Cl.
  *G06F 3/16*    (2006.01)
(52) U.S. Cl.
  CPC .................................. *G06F 3/165* (2013.01)
(58) Field of Classification Search
  CPC ... G06F 3/165; B60K 2370/164; B60K 35/00; B60K 2370/152; H04N 21/458; H04N 21/41422; H04N 21/4532; H04N 21/4622; B60R 16/0231; B60R 16/02
  USPC ........................................................ 715/716
  See application file for complete search history.

(56) References Cited

U.S. PATENT DOCUMENTS

| | | | |
|---|---|---|---|
| 2011/0307900 A1* | 12/2011 | Fatehpuria | G06F 9/50 718/104 |
| 2012/0124172 A1* | 5/2012 | Sparks | G06Q 20/123 709/219 |
| 2012/0265785 A1* | 10/2012 | Paik | G11B 19/08 707/E17.014 |
| 2015/0294617 A1 | 10/2015 | Yoon | |
| 2019/0042647 A1* | 2/2019 | Oh | G06F 16/636 |
| 2019/0342419 A1* | 11/2019 | Bromand | H04N 21/41422 |
| 2020/0081681 A1* | 3/2020 | Garmark | G06F 3/165 |
| 2020/0198547 A1* | 6/2020 | Karuturi | G06F 3/04842 |

FOREIGN PATENT DOCUMENTS

| | | |
|---|---|---|
| CN | 105493068 A | 4/2016 |
| JP | H1130986 A | 2/1999 |
| JP | 2001189969 A | 7/2001 |
| KR | 20140050848 A | 4/2014 |
| KR | 20150117020 A | 10/2015 |
| KR | 20170053252 A | 5/2017 |
| KR | 20180013159 A | 2/2018 |

* cited by examiner

Primary Examiner — Tuan S Nguyen
(74) Attorney, Agent, or Firm — Slater Matsil, LLP

(57) ABSTRACT

An audio video navigation (AVN) system for a vehicle includes a communication module configured to communicate with media sources providing media, a display module configured to display a playlist of the media, an output module configured to output the media, and a processor configured to selectively play any one of the same media based on a predetermined play preference mode when the same media are present in the playlist when the media in the playlist are played.

20 Claims, 5 Drawing Sheets

FIG. 4
Reference list
URL 1
URL 2

AUDIO VIDEO NAVIGATION SYSTEM FOR VEHICLE AND METHOD FOR PLAYING MEDIA THEREOF

CROSS-REFERENCE TO RELATED APPLICATIONS

This application claims the benefit of Korean Provisional Application No. 10-2019-0163354, filed on Dec. 10, 2019, which application is hereby incorporated herein by reference.

TECHNICAL FIELD

The present invention relates to an audio video navigation (AVN) system for a vehicle and a method for playing media on the AVN system.

BACKGROUND

Recently, vehicles have provided functions of multimedia devices that play media such as music and video in accordance with various demands of users in addition to serving as transportation means.

Accordingly, an AVN system for a vehicle can output media files stored in an external memory such as a USB drive or an SD card by being connected thereto, receive streaming media from an external streaming server and output the received streaming media, and receive media stored in a mobile terminal device of a user in a streaming manner through BLUETOOTH®-communication by being connected to the mobile terminal device and output the received media.

However, when media are received from the aforementioned various media sources, the same media may be included in a playlist, and in this case, there are problems that the same media may be repeatedly played without a selection process.

SUMMARY

An embodiment of the present invention provides an AVN system for a vehicle and a method for playing media thereof which can selectively play only one of the same media from among media provided from various sources according to a play reference mode of a user.

It will be appreciated by persons skilled in the art that the objects that could be achieved with embodiments of the present invention are not limited to what have been particularly described hereinabove and the above and other objects that embodiments of the present invention could achieve will be more clearly understood from the following detailed description.

An AVN system for a vehicle according to an embodiment of the present invention includes a communication module for performing communication with media sources providing media, a display module for displaying a playlist of the media, an output module for outputting the media, and a processor for selectively playing any one of the same media on the basis of a predetermined play preference mode when the same media are present in the playlist when media in the playlist are played.

A method for playing media of an AVN system for a vehicle according to an embodiment of the present invention includes performing communication with media sources providing media, displaying a playlist of the media, and selectively playing any one of the same media on the basis of a predetermined play preference mode when the same media are present in the playlist when media in the playlist are played.

According to an embodiment of the present invention, it is possible to provide more convenient functions to a user by playing only one of the same media from among media provided from various sources according to a play preference mode of the user.

It will be appreciated by persons skilled in the art that the effects that can be achieved with embodiments of the present invention are not limited to what has been particularly described hereinabove and other advantages of embodiments of the present invention will be more clearly understood from the following detailed description.

More specific technical effects of embodiments of the present invention will be described in more detail below with reference to the drawings.

BRIEF DESCRIPTION OF THE DRAWINGS

FIGS. 3 and 4 are diagrams for describing playlists according to an embodiment of the present invention.

DETAILED DESCRIPTION OF ILLUSTRATIVE EMBODIMENTS

Reference will now be made in detail to the embodiments of the present invention, examples of which are illustrated in the accompanying drawings. Wherever possible, the same reference numbers will be used throughout the drawings to refer to the same or like parts. The suffixes "module" and "unit" of elements herein are used for convenience of description and thus can be used interchangeably and do not have any distinguishable meanings or functions. Further, in the following description of embodiments of the present invention, a detailed description of known functions and configurations incorporated herein will be omitted when it may obscure the subject matter of the present invention. The attached drawings are used to aid in the understanding of the embodiments disclosed in the specification, and the technical spirit disclosed in the specification is not limited by the attached drawings and should be understood to cover all changes, equivalents and substitutions included in the spirit and technical scope of the present invention.

While terms, such as "first", "second", etc., may be used to describe various components, such components must not be limited by the above terms. The above terms are used only to distinguish one component from another.

It will be understood that when one element is referred to as being "connected to", "coupled to", or "accessing" another element, one element may be "connected to", "coupled to", or "accessing" another element via a further element although one element may be directly connected to or directly accessing another element. When an element is "directly coupled" or "directly connected" to another element, it should be understood that no element is present between the two elements.

An element described in the singular form is intended to include a plurality of elements unless the context clearly indicates otherwise.

In the specification of the present invention, it will be further understood that the terms "comprise" and "include" specify the presence of stated features, integers, steps, operations, elements, components, or combinations thereof, but do not preclude the presence or addition of one or more other features, integers, steps, operations, elements, components, or combinations.

Figure 1:
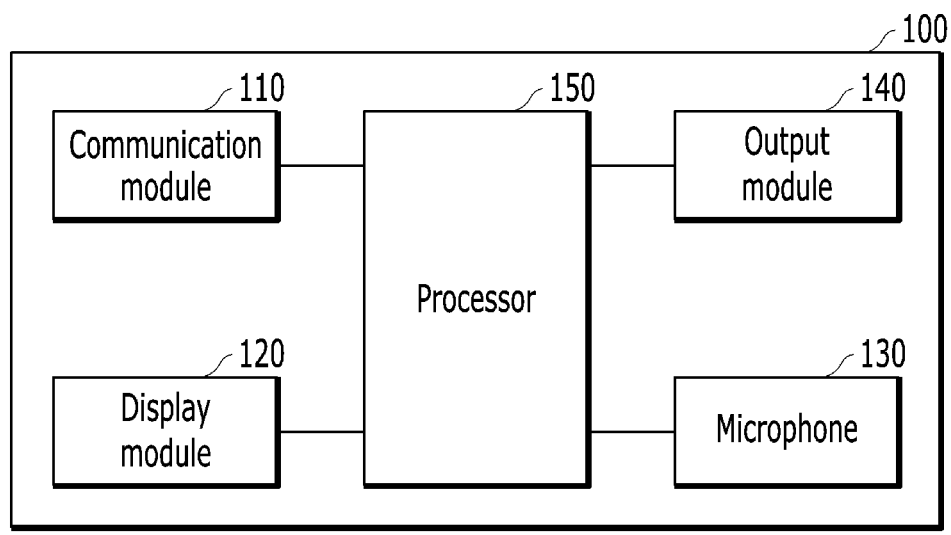
FIG. 1 is a block diagram showing an AVN system for a vehicle according to an embodiment of the present invention.

FIG. 1 is a block diagram showing an AVN system for a vehicle according to an embodiment of the present invention.

Figure 2:
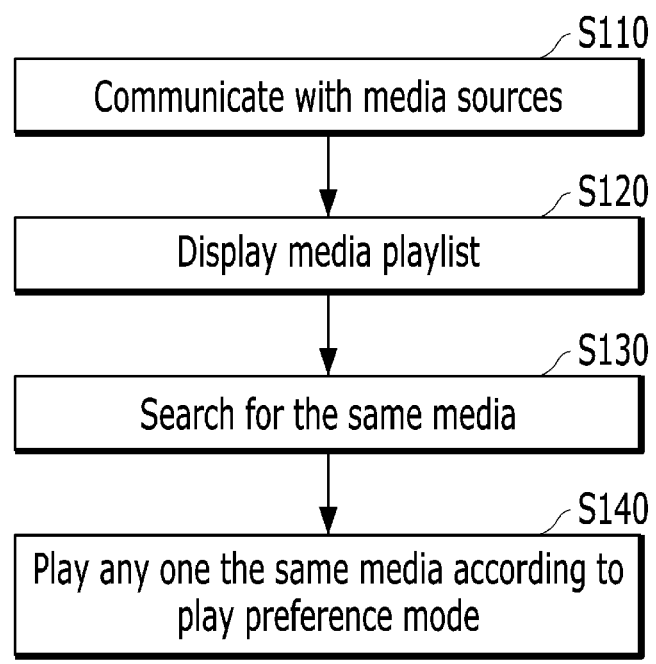
FIG. 2 is a flowchart showing a process of playing media using the AVN system for a vehicle according to an embodiment of the present invention.

FIG. 2 is a flowchart showing a process of playing media using the AVN system for a vehicle according to an embodiment of the present invention.

Figure 3:
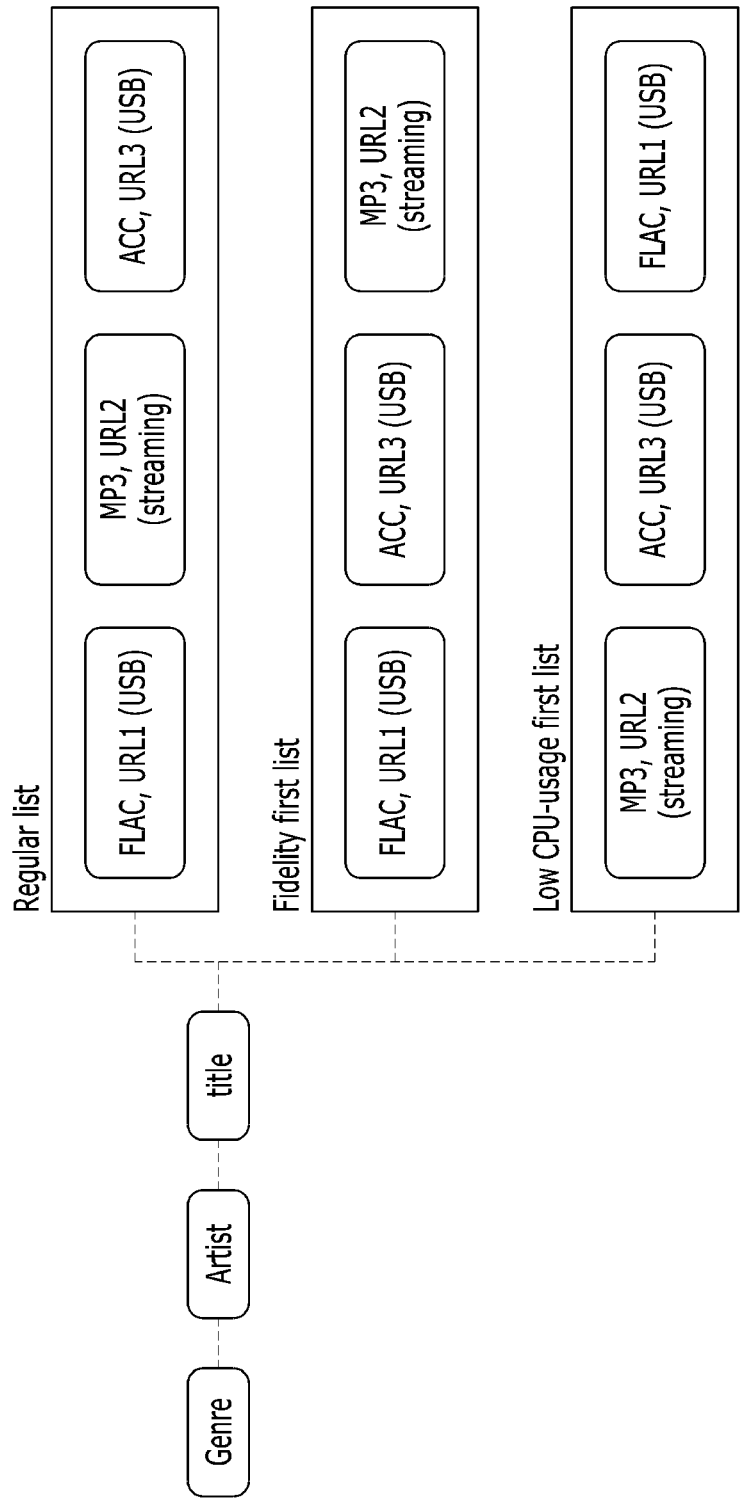

FIGS. 3 and 4 are diagrams for describing playlists according to an embodiment of the present invention.

Figure 5:
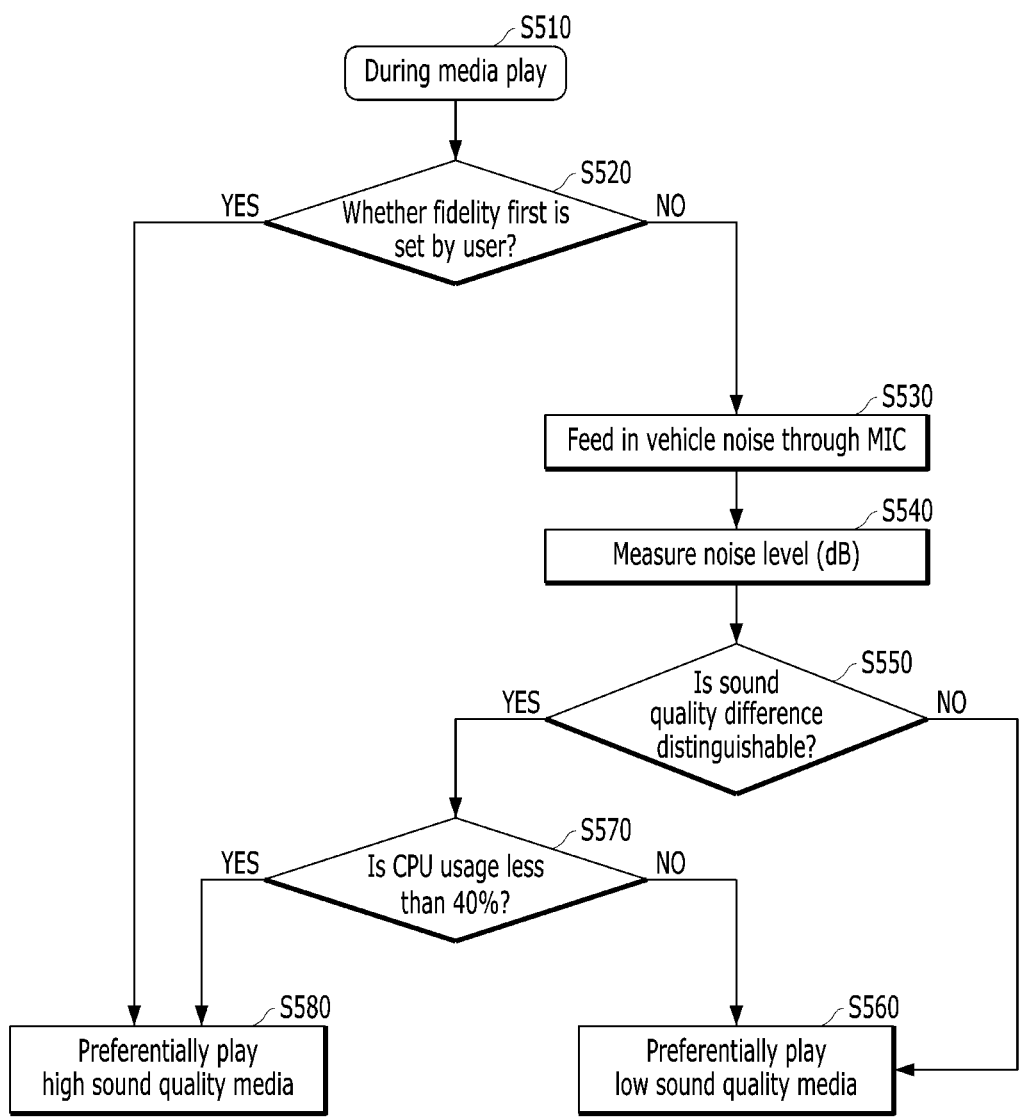
FIG. 5 is a flowchart showing a process of playing any one of the same media on the basis of a fidelity first mode according to an embodiment of the present invention.

FIG. 5 is a flowchart showing a process of playing any one of the same media on the basis of a fidelity first mode according to an embodiment of the present invention.

Referring to FIGS. 1 to 5, an AVN system 100 for a vehicle according to an embodiment of the present invention includes a communication module 110, a display module 120, a microphone 130, an output module 140, and a processor 150.

The communication module 110 performs communication with different media sources that provide media.

Here, when the different media sources include an external memory such as a USB drive and an SD card, the communication module no may be connected to the external memory such that media files stored in the external memory can be played.

Further, when the different media sources include a streaming server, the communication module 110 may receive streaming media from the external streaming server.

Further, the different media sources include a mobile terminal device. The communication module 110 may receive media from the mobile terminal device through a wired cable or BLUETOOTH®-communication in a streaming manner.

The display module 120 displays (outputs) information processed in the AVN system 100. For example, the display module 120 may display execution screen information of application programs executed in the AVN system 100, or user interface (UI) and graphical user interface (GUI) information according to the execution screen information. Further, the display module 120 may display a media play screen, a navigation screen, etc.

The microphone 130 picks up noise inside the vehicle.

The output module 140 is a speaker of the AVN system 100 and outputs sound that can be output from the AVN system 100, such as navigation related sound, media sound, and warning sound of the AVN system 100.

The processor 150 controls the overall operation of the AVN system 100 according to embodiments of the present invention.

Hereinafter, a process of selectively playing any one of the same media from among media provided from various sources according to a play preference mode of a user according to embodiments of the present invention will be described with reference to FIGS. 2 to 5.

Embodiments of the present invention provide a structure in which a play preference mode can be designated in media playback such that a user can use media by applying various preference modes such as a data saving mode and a fidelity first mode as the play preference mode through the structure.

Here, in media playback, streaming media provided by a streaming server and media stored in an external memory may be integrated and managed using a list.

In addition, when there are media having the same title, the media having the same title may be managed using various types of lists.

List management for media having the same title may be performed for various play preference modes.

According to embodiments of the present invention, when the same media are present, "streaming server first", "external memory preference", or the like may be selected according to preference selection of a user, and usage of communication data can be reduced in the case of "external memory first".

In addition, in the case of "fidelity first", high sound quality media may be preferentially played when the same media are present in a playlist.

Further, when CPU usage of the AVN system 100 becomes an issue, low sound quality media may be preferentially played. For example, in the case of a FLAC file that requires high CPU usage, an MP3 file having the same title may be played.

Referring to FIG. 3, when the same title is present in various media sources (for example, a streaming server, an external memory, and a mobile terminal device), media files (identified by unique URLs thereof) for the same title may be managed as a list.

For example, FIG. 3 shows a regular list in which media are managed in the order in which the media have been added, a fidelity first list in which media are managed in the order of fidelity, and a low CPU-usage first list in which media are managed on the basis of CPU usage.

Here, heap may be added to or deleted from the aforementioned lists. For example, a time of O(log N) may be required for addition and a time of O(10) may be required for deletion. Items in a list maintained with a key value that is a title can be searched with O(1) time complexity using the aforementioned heap.

Referring to FIG. 4, a table with respect to a list in which URLs are referenced may be managed as shown in FIG. 4 such that the list is unreferenced when an item of a URL is deleted.

In the reference list of FIG. 4, a key is a URL and a value is a list.

That is, the aforementioned regular list, the fidelity first list in which media are managed in the order of fidelity, and a low CPU-usage first list in which media are managed on the basis of CPU usage can be referenced in the list.

Referring to FIG. 2, the processor 150 performs communication with different media sources that provide media through the communication module 110 (S110), and generates a playlist of the media sources and displays the playlist on the display module 120 (S120).

Here, the media sources may include two or more of an external memory in which media files are stored, a streaming server that provides the media in a streaming manner, and a mobile terminal device, as described above.

The playlist may be a list in which media received from the media sources are integrated.

When media in the playlist is played, the processor 150 searches the playlist for the same media having the same title (S130) and plays any one of the searched same media according to a predetermined play preference mode (S140).

For example, the play preference mode may be a data saving mode. In this case, the processor 150 can play a media file stored in an external memory other than a media file acquired through data telecommunication from among the searched same media.

As another example, the play preference mode may be a fidelity first mode. In this case, the processor 150 can play high sound quality media having quality equal to or greater than a predetermined level from among the searched same media.

Here, the processor 150 can play the high sound quality media on the basis of a current state of the vehicle.

That is, the processor 150 can periodically measure noise inside the vehicle through the microphone 130, calculate the average of noise inside the vehicle, play high sound quality media when average noise is equal to or less than a predetermined decibel level, and play low sound quality media having quality less than the predetermined level from among the same media when average noise exceeds the predetermined decibel level.

The predetermined decibel level refers to a noise level at which a user can generally distinguish high sound quality from low sound quality and may be, desirably, 30 to 40 dB.

Further, the processor 150 may measure CPU usage of the AVN system 100. When the measured CPU usage is equal to or less than predetermined usage, the current CPU operation state is suitable to play high sound quality media. Thus, the processor 150 can play high sound quality media having quality equal to or higher than the predetermined level from among the same media.

Further, when the measured CPU usage exceeds the predetermined usage, the current CPU usage is high and thus problems such as failure of a navigation function of the AVN system 100, a response time delay due to system overload, and audio under run may be generated. Accordingly, the processor 150 can play low sound quality media having quality less than the predetermined level from among the same media.

Further, when the speed of the vehicle measured through the AVN system 100 is equal to or less than a predetermined speed, the processor 150 can play high sound quality media having quality equal to or higher than the predetermined level from among the same media. The predetermined speed may be a speed at which the vehicle generates noise of a level at which a user can distinguish high sound quality from low sound quality during traveling.

Further, when the vehicle is stopped and the CPU usage of the AVN system 100 is equal to or less than the predetermined usage, the processor 150 can play high sound quality media having quality equal to or higher than the predetermined level from among the same media.

Further, when it is determined that traffic congestion occurs for a time longer than a media play time (e.g., 3 minutes) of the same media on the basis of navigation traffic congestion situation information provided by the AVN system 100, the CPU usage is low because a navigation map barely changes, and thus the processor 150 can play high sound quality media having quality equal to or higher than the predetermined level from among the same media.

Next, referring to FIG. 5, when playing media (S510), the processor 150 determines whether the fidelity first mode has been set by a user (S520).

When the fidelity first mode has been set (YES to S520), the processor 150 can preferentially play high sound quality media having quality equal to or higher than the predetermined level from among the same media (S580).

However, when the fidelity first mode has not been set (NO to S520), the processor 150 feeds in noise inside the vehicle through the microphone 130 (S530) and measures a noise level of the average of the noise (S540), as described above.

The processor 150 determines whether the measured noise level is equal to or less than a predetermined decibel at which high sound quality can be distinguished from low sound quality (S550).

When the measured noise level exceeds the predetermined decibel level at which high sound quality can be distinguished from low sound quality (NO to S550), the processor 150 plays low sound quality media having quality less than the predetermined level from among the same media (S560).

However, when the measured noise level is equal to or less than the predetermined decibel at which high sound quality can be distinguished from low sound quality (YES at S550), the processor 150 determines whether the CPU usage of the AVN system 100 exceeds the predetermined usage, e.g., 40% (S570).

When the CPU usage of the AVN system 100 exceeds the predetermined usage (NO to S570), the processor 150 can play low sound quality media having quality less than the predetermined level from among the same media (S560), and when the CPU usage of the AVN system 100 is equal to or less than the predetermined usage (YES to S570), the processor 150 can preferentially play high sound quality media having quality equal to or higher than the predetermined level from among the same media (S580).

Although terminology used in describing embodiments of the present invention has been selected from general technology ones widely used in the art taking into consideration functions thereof in the present invention, the terms may be changed depending on the intention or convention of those skilled in the art or the introduction of new technology, and thus, the terms should be construed based on the overall contents of this specification.

The scope of the invention should be determined by the appended claims and their legal equivalents, not by the above description, and all changes coming within the meaning and equivalency range of the appended claims are intended to be embraced therein.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An audio video navigation (AVN) system for a vehicle, the AVN system comprising:
   one or more processors;
   a communication module executing using the one or more processors and configured to communicate with a plurality of media sources including an external memory and a streaming server, and receive a list of at least one available media file from each of the external memory and the streaming server;
   a display module executing using the one or more processors and configured to display a playlist of multiple media files according to the lists received from the external memory and the streaming server, wherein the multiple media files include available media files having the same title;
   an output module executing using the one or more processors and configured to output sounds; and a processor of the one or more processors that is configured to selectively play, from the playlist, one of the available media files having the same title and having different sound qualities based on a play preference mode;
wherein the streaming server is accessible to the AVN system via a telecommunication service;
wherein the play preference mode includes a data saving mode in which usage of the telecommunication service is reduced relative to other modes; and
wherein, in the data saving mode, the processor is configured to select from the playlist the one of the available media files having the same title and having low sound quality from the list received from the external memory.

2. The AVN system of claim 1, wherein the playlist integrates the multiple media files from the lists received from the external memory and from the streaming server includes a list in which the media files received from the media sources is integrated.

3. The AVN system of claim 1, wherein the play preference mode includes a high sound quality mode, and the processor is configured, in the high sound quality mode, to selectively play a media file having sound quality equal to or higher than a predetermined level from among the available media files having the same title.

4. The AVN system of claim 3, wherein the processor is configured to selectively play the media file having sound quality equal to or higher than the predetermined level based on a current state of the vehicle.

5. The AVN system of claim 4, further comprising a microphone configured to measure noise inside the vehicle, wherein the processor is configured to selectively play the media file having the sound quality equal to or higher than the predetermined level when the measured noise is equal to or less than a predetermined decibel level.

6. The AVN system of claim 4, wherein the processor is configured to selectively play the media file having the sound quality equal to or higher than the predetermined level when CPU usage of the AVN system is equal to or less than a predetermined usage.

7. The AVN system of claim 4, wherein the processor is configured to selectively play the media file having the sound quality equal to or higher than the predetermined level when a travel speed of the vehicle is equal to or less than a predetermined speed.

8. A method for playing media of an audio video navigation (AVN) system for a vehicle, the method comprising:
performing communication with a plurality of media sources including an external memory and a streaming server;
receiving a list of at least one available media file from each of the external memory and the streaming server;
displaying a playlist of multiple media files according to the lists received from the external memory and the streaming server, wherein the multiple media files includes available media files having the same title; and
selectively playing, from the playlist, one of the available media files having the same title and that have different sound qualities based on a play preference mode;
wherein the streaming server is accessible to the AVN system via a telecommunication service;
wherein the play preference mode includes a data saving mode in which usage of the telecommunication service is reduced relative to other modes; and
wherein, in the data saving mode, selectively playing the one of the available media files having the same title comprises selecting the one of the available media files having the same title and having low sound quality from the list received from the external memory.

9. The method of claim 8, wherein the playlist integrates the multiple media files from the lists received from the external memory and from the streaming server includes a list in which the media received from the media sources is integrated.

10. The method of claim 8, wherein the play preference mode includes a high sound quality mode, and, in the high sound quality mode, selectively playing comprises selectively playing a media file having sound quality equal to or higher than a predetermined level from among the available media files having the same title.

11. The method of claim 10, wherein selectively playing comprises selectively playing the media file having sound quality equal to or higher than the predetermined level based on a current state of the vehicle.

12. The method of claim 10, further comprising measuring noise inside the vehicle through a microphone, wherein selectively playing comprises selectively playing the media file having sound quality equal to or higher than the predetermined level when the measured noise is equal to or less than a predetermined decibel level.

13. The method of claim 10, wherein selectively playing comprises selectively playing the media file having sound quality equal to or higher than the predetermined level when CPU usage of the AVN system is equal to or less than a predetermined usage.

14. The method of claim 10, wherein selectively playing comprises selectively playing the media file having sound quality equal to or higher than the predetermined level when a travel speed of the vehicle is equal to or less than a predetermined speed.

15. An audio video navigation (AVN) system for a vehicle, the AVN system comprising:
one or more processors;
a communication device executing using the one or more processors and configured to communicate with a plurality of media sources including an external memory and a streaming server and receive a list of at least one available media file from each of the external memory and the streaming server;
a display device executing using the one or more processors and configured to display a playlist of multiple media files according to the lists received from the external memory and the streaming server, wherein the multiple media files includes available media files having the same title;
a microphone configured to measure noise inside the vehicle;
a speaker configured to output sounds; and
a processor of the one or more processors configured to selectively play, from the playlist, one of the available media files having the same title and that have different sound qualities, based on a play preference mode;
wherein the streaming server is accessible to the AVN system via a telecommunication service;
wherein the play preference mode includes a data saving mode in which using of the telecommunication service is reduced relative to other modes; and
wherein the processor is configured, in the data saving mode, to select from the playlist the one of the available media files having the same title and having low sound quality from the list received from the external memory.

16. The AVN system of claim 15, wherein the play preference mode includes a high sound quality mode and the processor is configured, in the high sound quality mode, to selectively play a media file having sound quality equal to or higher than a predetermined level from among the available media files having the same title.

17. The AVN system of claim 16, wherein the processor is configured to selectively play the media file having sound quality equal to or higher than the predetermined level when the measured noise is equal to or less than a predetermined decibel level.

18. The AVN system of claim 16, wherein the processor is configured to selectively play the media file having sound quality equal to or higher than the predetermined level when CPU usage of the AVN system is equal to or less than a predetermined usage.

19. The AVN system of claim 16, wherein the processor is configured to selectively play the media file having sound quality equal to or higher than the predetermined level when a travel speed of the vehicle is equal to or less than a predetermined speed.

20. The AVN system of claim 15, wherein the playlist integrates the multiple media files from the lists received from the external memory and from the streaming server includes a list in which the media file received from the media sources is integrated.

\* \* \* \* \*